United States Patent
Chuah et al.

(10) Patent No.: US 6,587,672 B1
(45) Date of Patent: Jul. 1, 2003

(54) METHODS AND APPARATUS FOR ENHANCED POWER RAMPING VIA MULTI-THRESHOLD DETECTION

(75) Inventors: Mooi Choo Chuah, Eatontown, NJ (US); On-Ching Yue, Middletown, NJ (US); Qinqing Zhang, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/203,924

(22) Filed: Dec. 2, 1998

(51) Int. Cl.[7] .............................. H04B 1/00; H04B 7/00
(52) U.S. Cl. ......................................... 455/69; 455/522
(58) Field of Search .................. 455/69, 522, 343, 455/70, 127, 67.1, 513, 63

(56) References Cited

U.S. PATENT DOCUMENTS

| | | | |
|---|---|---|---|
| 4,479,252 A | * 10/1984 | Souchay | 455/223 |
| 5,386,589 A | * 1/1995 | Kanai | 455/522 |
| 5,629,934 A | 5/1997 | Ghosh et al. | |
| 5,794,129 A | * 8/1998 | Komatsu | 455/522 |
| 5,933,781 A | * 8/1999 | Willenegger | 455/522 |
| 5,999,826 A | * 12/1999 | Whinnett | 455/562 |
| 6,208,873 B1 | * 3/2001 | Black | 455/522 |

FOREIGN PATENT DOCUMENTS

EP 0 565 507 A2 10/1993

* cited by examiner

Primary Examiner—Vivian Chin
Assistant Examiner—James K Moore

(57) ABSTRACT

The present invention provides a method for use in a UMTS receiver of detecting a signal transmitted by a UMTS transmitter which includes determining whether the signal is greater than or equal to at least a first power threshold value when the signal is below an initial detection threshold value, and informing the transmitter when the signal is greater than or equal to the first power threshold value such that the transmitter can increase a signal strength of the signal by a first predetermined amount and re-transmit. In another aspect of the invention, a method for use in a UMTS transmitter of power ramping a signal transmitted by the transmitter and received by a UMTS receiver includes increasing a signal strength of the signal by a first predetermined amount when informed by the receiver that the signal is greater than or equal to a first power threshold value but below an initial detection threshold value, and re-transmitting the signal.

50 Claims, 10 Drawing Sheets

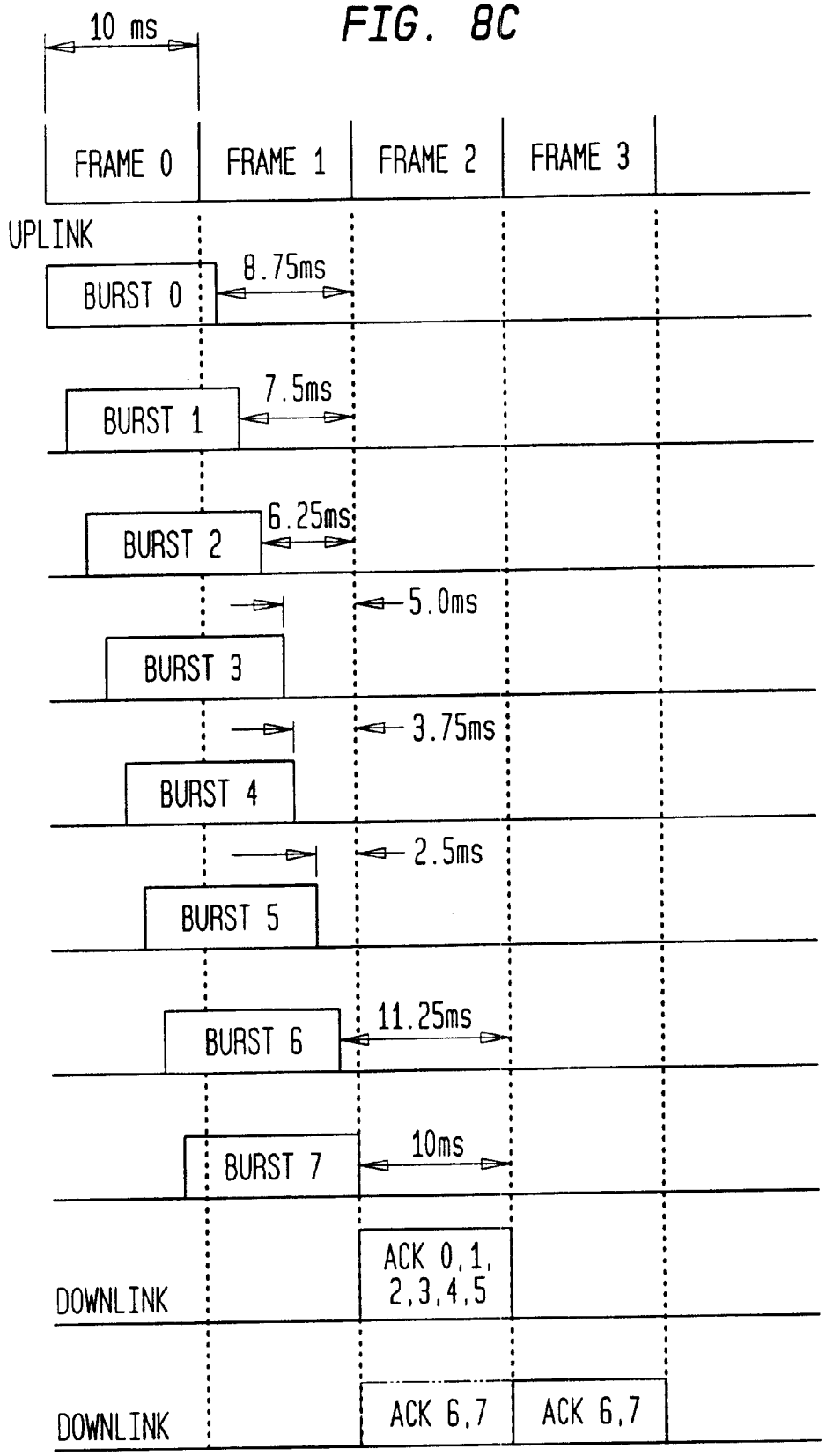

METHODS AND APPARATUS FOR ENHANCED POWER RAMPING VIA MULTI-THRESHOLD DETECTION

CROSS REFERENCE TO RELATED APPLICATIONS

This application is related to the patent application entitled: "Methods And Apparatus For Providing Short RACH Frames For Fast Latency," filed concurrently herewith.

FIELD OF THE INVENTION

The present invention relates to methods and apparatus for providing power ramping in a communications system and, more particularly, to methods and apparatus for providing enhanced power ramping via multi-threshold detection in a receiver of a Universal Mobile Telecommunications System.

BACKGROUND OF THE INVENTION

A major effort has been underway in the last decade to integrate multimedia capabilities into mobile communications. The International Telecommunications Union (ITU) and other organizations have been attempting to develop standards and recommendations that ensure that mobile communications of the future will be able to support multimedia applications with at least the same quality as existing fixed networks. Particularly, many global research projects have been sponsored in order to develop such next (third) generation mobile systems. Research and Development of Advanced Communication Technologies in Europe, RACE-1, and RACE-2, and Advanced Communications Technology and Services (ACTS) are examples of such efforts in Europe. It is known that in order to provide end users with the requisite service quality for multimedia communications, Internet access, video/picture transfer, high bit rate capabilities are required. Given such requirements, bearer capability targets for a third generation system have been defined as 384 kilobits per second (kb/s) for full coverage area and 2 Megabits per second (Mb/s) for local area coverage.

Universal Mobile Telecommunications System (UMTS) is a new radio access network based on 5 Megahertz Wideband Code Division Multiple Access (W-CDMA) and optimized for support of third generation services including multimedia-capable mobile communications. Since major design goals of UMTS are to provide a broadband multimedia communications system that integrates infrastructure for mobile and fixed communications and to offer, inter alia, the same range of services as provided by the fixed and wireless communications networks, UMTS must provide circuit-switched as well as packet-switched services, a variety of mixed media traffic types, and bandwidth-on-demand. However, providing multimedia support implies the need for flexibility, that is, being able to support services with different bit rates and $E_b/N_0$ requirements, and to multiplex such services in a multiservice environment. UMTS is designed to be able to support such demands.

Referring to FIG. 1, an exemplary block diagram of a UMTS access network is shown. Particularly, a plurality of remote terminals 2 and 4 (e.g., mobile terminals) communicate with base stations (NODE-B) 6 via W-CDMA wireless links 8. The remote terminals may be a variety of devices such as a wireless phone 2 or a portable personal computer 4 with an internal or external modem. In the UMTS standard, a base station is called a NODE-B. These base stations communicate with a network component that provides radio resource management functions and is called a Radio Network Controller (RNC). Since UMTS is a W-CDMA system, soft handoffs are supported. In the case of soft handoffs, there are two base stations 6 serving one remote terminal. Thus, the remote terminal sends frames to these two base stations. When the two base stations receive the frames from the remote terminal, they send them to a Frame Selector Unit (FSU). The FSU decides which is a better frame, in terms of frame quality, to be sent to the core network. In UMTS, the FSU may be physically integrated with the RNC and as such, in FIG. 1, the RNC and FSU are shown as block 10, but also are separated functionally as block 12 (FSU) and block 14 (RNC). Other elements in the UMTS network perform conventional functions such as: the xLR databases 20, which provide home and visiting location information; and the interworking function (IWF) units. It is to be appreciated that the Universal Mobile Switching Center (UMSC) 16 serves as the mobile switching center for the base stations 6 in the UMTS. Sub-networks 18 are wireless service provider networks and CNI through CNn are the core networks 24 to which the remote terminals are ultimately coupled.

Referring to FIG. 2, a diagram of the typical protocol stack in UMTS is shown. In UMTS, Layer 1 (L1) is the physical layer (PHY) which offers information transfer services to the MAC (Media Access Control) layer and higher layers. The physical layer transport services are described by how and with what characteristics data is transferred over the transport channels of the radio interface. Layer 2 (L2) is comprised of sublayers which include MAC, LAC (Link Access Control), and RLC and RLC' (Radio Link Control). In UMTS, the functions performed in RLC are split and thus two RLC protocols (RLC and RLC') are specified. The RLC and MAC layers provide real-time and non-real-time services. The MAC layer controls but does not carry out the multiplexing of data streams originating from different services. That is, the MAC layer, via logical channels, allows common physical communications channels (e.g., broadcast channel) to be shared by a number of remote terminals. IP (Internet Protocol) is the network layer.

"Uu" refers to the UMTS-specific interface between a remote terminal and a base station, while "Iub" refers to the UMTS-specific interface between a base station and the RNC/FSU. Layer 2 of the radio access network (i.e., left side of NODE-B on the protocol stack) is split into RLC and MAC layers, while Layer 2 of the core network (i.e., right side of NODE-B on the protocol stack) is more related to the technology used to transport network layer frames, e.g., ATM (Asynchronous Transfer Mode) or Frame Relay. IP is shown as the transport protocol, however, UMTS is not so limited. That is, UMTS can cater to other transport protocols. Further details on the protocol layers may be found in Dahlman et al., "UMTS/IMT-2000 Based on Wideband CDMA," IEEE Communications Magazine, pp. 70–80 (September 1998) and in ETSI SMG2/UMTS L2 & L3 Expert Group, "MS-UTRAN Radio Interface Protocol Architecture; Stage 2," Tdoc SMG2 UMTS-L23 172/98 (September 1998).

One of the logical channels associated with the media access control (MAC) protocol of UTMS is the random access channel (RACH). RACH is an up-link common transport channel used to carry control information and short user packets from a remote terminal. Referring to FIG. 3A, a block diagram of an exemplary hardware implementation of a non-coherent RACH detection algorithm for use in a UMTS base station (NODE-B in FIG. 1) is shown. The RACH receiver 30 is capable of providing the following functions: detection, demodulation and decoding, and acknowledgement. The purpose of detection is to determine if a RACH burst (i.e., access request signal) is being sent by a remote terminal and to resolve the strongest multipath components of the incoming burst. The receiver 30 also demodulates and decodes the message contained within the corresponding RACH to ascertain the remote terminal identifier and the requested service. After decoding a remote terminal RACH transmission, the receiver generates an acknowledgement signal which the base station transmits to the remote terminal over a Forward Access Channel (FACH).

The RACH receiver 30 preferably performs the above functions in accordance with the following structure. A RACH transmission burst is received and demodulated by mixers 32 and then filtered in filters 34. The signal is then sampled in sampling unit 36. Despreader 38 decodes the signal in accordance with the spreading sequence, in this case, 512 Gold code. The decoded signal is buffered (buffer 40) and sent to time shifting unit 50. Also, the output of the despreader 38 is provided to integrator 42. The outputs of the integrator 42 are mixed (mixer 44) and provided to timing detector 46 and then threshold detector 48. The output of the threshold detector 48 indicates whether a valid signal was received from the remote terminal. This result is provided to time shifting unit 50. If it is a valid signal (e.g., above pre-determined threshold), the decoded signal is then downsampled by unit 52. Then, depending on the preamble, described below, the signal passes. through the 16 tap filter unit 54 to the preamble signature searcher 56. The output of the searcher 56 provides the base station with the encoded remote terminal's identifier and information as to the service(s) requested by the remote terminal. The encoded information is then decoded by a convolutional decoder 58 and checked by a CRC (cyclical redundancy check) decoder 59.

Referring to FIG. 3C, a block diagram of an exemplary hardware implementation of an uplink transmitter 60 for use in a UMTS remote terminal (e.g., remote terminals 2 and 4) is shown. In a UMTS remote terminal, data modulation is dual channel QPSK (quaternary phase shift keying), that is, the I and Q channels are used as two independent BPSK (binary phase shift keying) channels. For the case of a single uplink DPDCH (dedicated physical data channel), the DPDCH and the DPCCH (dedicated physical control channel) are respectively spread by two different channelization codes ($C_C$ and $C_D$) via mixers 62 and 64 and transmitted on the I and Q branches. The I and Q branches are multiplexed in IQ MUX 66. The total spread signal I+jQ is then complex scrambled by a connection-specific complex scrambling code in mixer 68. The real portion of the signal is then filtered in root-raised cosine filter 70, while the imaginary portion of the signal is filtered in root-raised cosine filter 72. The output of filter 70 is modulated in mixer 74 with a cos ($\omega$t) signal. The output of filter 72 is modulated in mixer 76 with a –sin ($\omega$t) signal. The two modulated signals are then added in adder 78. The composite signal is then amplified to a predetermined signal strength (i.e., power level) in amplifier 80 and then transmitted by an antenna (not shown). A similar arrangement may be used in the base station.

Referring back to FIG. 3B, a graphical representation illustrating how the detection algorithm works in the existing UMTS receiver is shown. When the signal strength of an access request signal sent by a remote terminal to a UMTS base station exceeds a detection threshold, e.g., DTHRESH1 (equal to 7 dB), the receiver can detect the signal and pass the message on to the convolutional decoder 58 and the CRC decoder 59. If the CRC is correct, then the receiver sends an acknowledgement signal to be transmitted to the sender. This may be accomplished through the transmission section of the base station, as is known. That is, the transmission section receives the indication from the CRC decoder 59 of the receiver and, in response, generates and transmits the acknowledgement signal. However, the receiver cannot differentiate signals falling below that single threshold. The problem with this deficiency is that the receiver does not distinguish between valid access signals that merely have a weak signal strength versus noise or collision-effected signals. For example as shown in FIG. 3B, while the receiver can detect Signal 1 sent from a remote terminal, it does not detect a signal having a signal strength falling below the detection threshold level, i.e., Signal 2, since the existing UMTS receiver has only a single detection threshold. With the existing detection algorithm, the receiver only sends an acknowledgement signal (e.g., "correct reception" signal) to the sender if the signal exceeds DTHRESH1 and the CRC of the access request message is correct. For all other cases, the sender needs to increase the signal strength by, for example, 3 dB (e.g., by adjusting output amplifier 80). However, the power increase of 3 dB may be too much if the original signal power was just below DTHRESH1. This may then result in saturation of the receiver or cause interference with other signals being transmitted in the area.

SUMMARY OF THE INVENTION

The present invention provides methods and apparatus for providing multi-detection thresholds in a receiver of a communications system such as, for example, the UMTS. In this manner, a receiver implementing the invention can differentiate signals falling below a single threshold. Advantageously, the receiver distinguishes between valid access signals that merely have a weak signal strength versus noise or collision-effected signals. Also, the invention allows the sender to increase its transmit power level incrementally based on the content of a message received from the receiver, thereby reducing the possibility that the sender will increase signal strength resulting in saturation of the receiver or interference with other signals being transmitted in the area.

In one aspect of the invention, a method for use in a receiver of detecting a signal transmitted by a transmitter comprises determining whether the signal is greater than or equal to at least a first power threshold value when the signal is below an initial detection threshold value, and informing the transmitter when the signal is greater than or equal to the first power threshold value such that the transmitter can increase a signal strength of the signal by a first predetermined amount and re-transmit. Preferably, the method also includes determining whether the signal is greater than or equal to a second power threshold value when the signal is below the initial detection threshold value and the first power threshold value, and informing the transmitter when the signal is greater than or equal to the second power threshold value such that the transmitter can increase the signal strength of the signal by a second predetermined amount and re-transmit. Still further, the method preferably includes providing the transmitter with no indication when the signal is not greater than or equal to the second. power threshold value such that the transmitter can increase the signal strength of the signal by a third predetermined amount and re-transmit. Also, the method preferably includes informing the transmitter when the signal is greater than or equal to the initial detection threshold value but included an invalid CRC code such that the transmitter can re-transmit.

In another aspect of the invention, a method for use in a transmitter of power ramping a signal transmitted by the transmitter and received by a receiver comprises increasing a signal strength of the signal by a first predetermined amount when informed by the receiver that the signal is greater than or equal to a first power threshold value but below an initial detection threshold value, and re-transmitting the signal. The method also preferably includes increasing the signal strength of the signal by a second predetermined amount for re-transmission when informed by the receiver that the signal is greater than or equal to a second power threshold value but below the initial detection threshold value and the first power threshold value. Still further, the method preferably includes increasing the signal strength of the signal by a third predetermined amount for re-transmission when no indication is received from the receiver. Also, the method preferably includes re-transmitting the signal when informed by the receiver that the signal is greater than or equal to the initial detection threshold value but included an invalid CRC code.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 8C illustrates an access slot structure used in a UMTS RACH.

DETAILED DESCRIPTION OF PREFERRED EMBODIMENTS

The present invention is described below in the context of multi-threshold detection in the MAC layer of the UMTS, particularly, with respect to detection of a random access request signal in the random access channel or RACH. However, it is to be appreciated that the teachings of the invention discussed herein are not so limited. That is, the detection methodologies of the invention are applicable to other communications systems where remote terminals (e.g., mobile or fixed) transmit and receive signals (e.g., data and control signals) to and from a base station or other communications system access point. Also, the multi-threshold detection scheme may be implemented in accordance with a receiver in a remote terminal. It is also to be appreciated that the signal transmitted by a remote terminal over the RACH may preferably be an access request or data packets in the case where the RACH is being utilized for UMTS short message services. In addition, it is to be understood that methodologies described herein for use in a remote terminal or a base station are executed by one or more processors respectively associated therewith. The term "processor" as used herein is intended to include any processing device, including a CPU (central processing unit), or microprocessor, and associated memory. The term "memory" as used herein is intended to include memory associated with a processor or CPU, such as RAM, ROM, a fixed memory device (e.g., hard drive), or a removable memory device (e.g., diskette). In addition, the processing unit may include one or more input devices, e.g., keypad or keyboard, for inputting data to the processing unit, as well as one or more output devices, e.g., CRT display, for providing results associated with the processing unit. Accordingly, software instructions or code associated with implementing the methodologies of the present invention may be stored in associated memory and, when ready to be utilized, retrieved and executed by an appropriate CPU. Also, the term "remote terminal" refers to any device capable of communications with a base station. For example, a remote terminal may be mobile (e.g., wireless phone or portable personal computer with a wireless modem) or fixed (e.g., fixed personal computer with a wireless modem). Also, the terms "base station" and "node__b," are used interchangeably herein.

Figure 1:
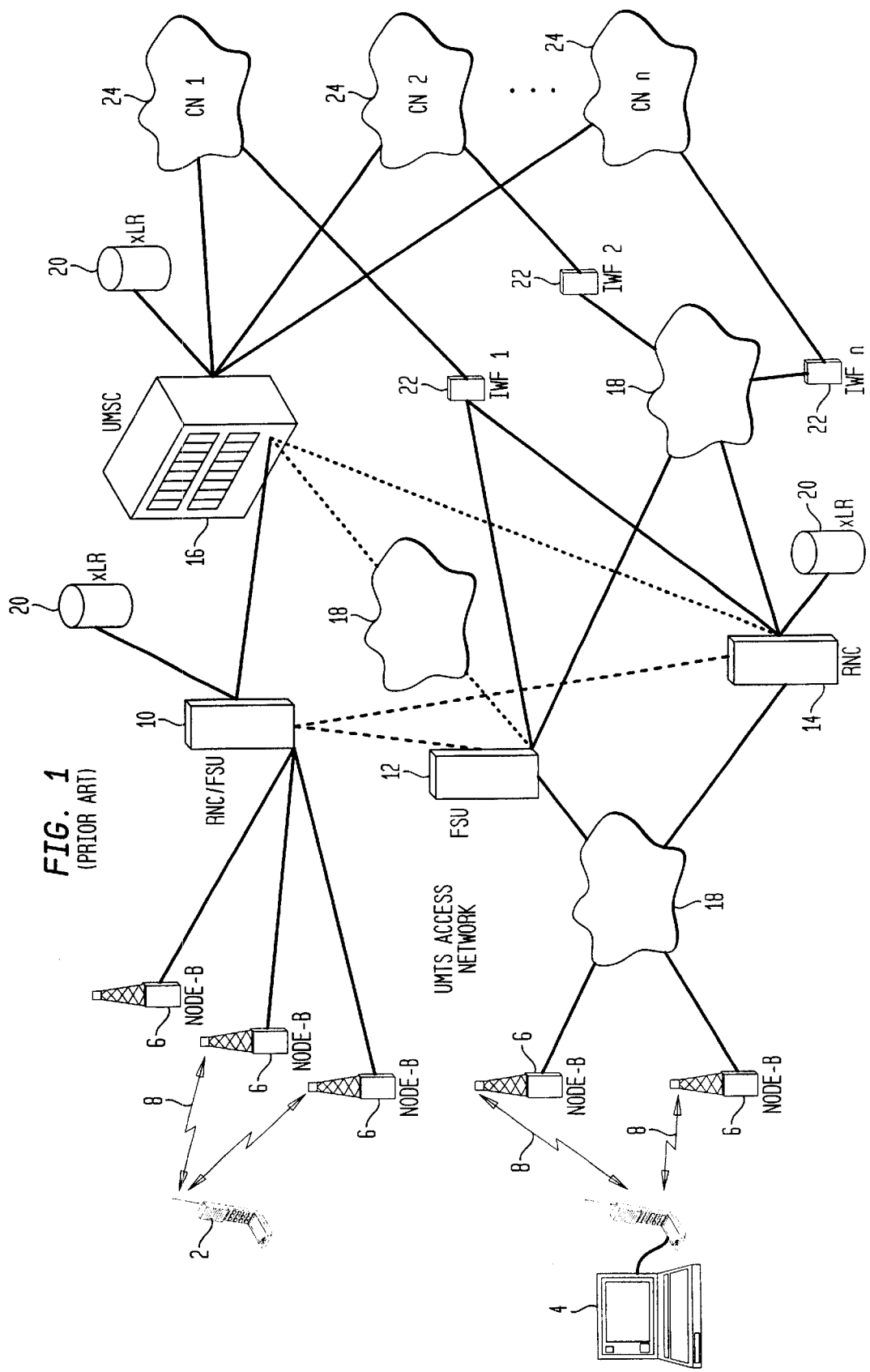
FIG. 1 is a block diagram of a UMTS access network.
Figure 2:
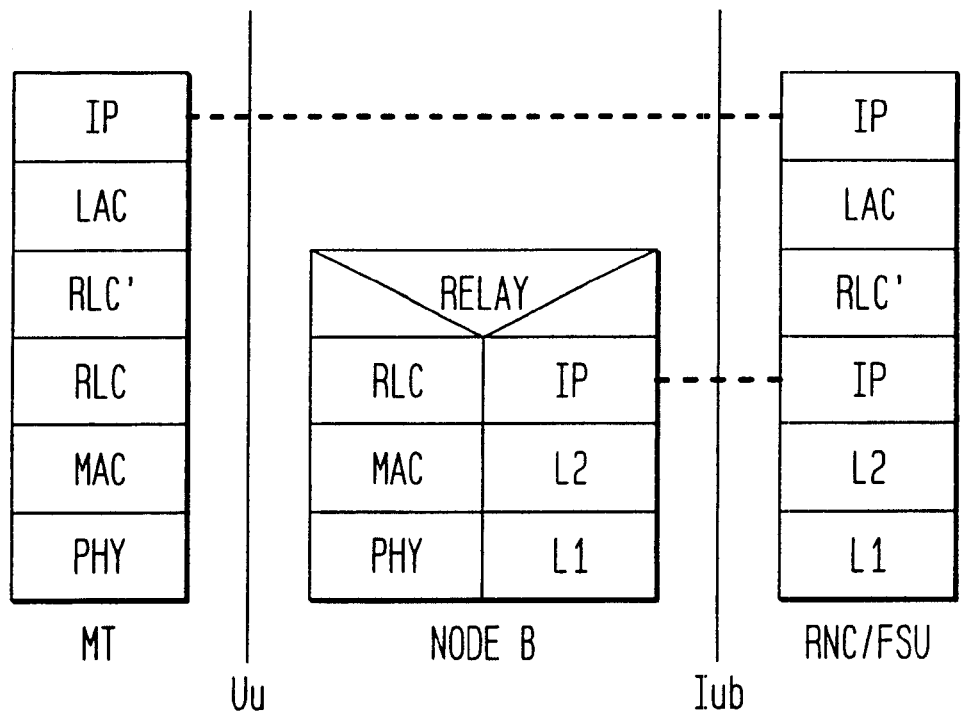
FIG. 2 is a diagram of a protocol stack associated with a UMTS.

Referring back to FIG. 1 and as previously mentioned, it is to be understood that the remote terminals, 2 and 4, are coupled to the UMTS access network through a wireless interface with base stations 6. In order to establish communications, the remote terminals send and receive media access control (MAC) frames over the wireless interface to and from the base stations 6. In the case of the terminal 4, an internal or external modem may be used to provide a wireless connection with the base stations. A remote terminal, such as remote terminal 2, typically has its own internal modem. Nonetheless, packets are typically generated or received at the remote terminal on a bursty random basis. The packets are buffered at the remote terminals until they are transmitted uplink to a base station. The base stations 6, as is known, provide wide-area wireless coverage and multiplex remote terminal traffic from their respective coverage area to their system's mobile switching center, e.g., UMSC 16 in FIG. 1. The base stations also broadcast (downlink) packets that are destined for one or more of the remote terminals in its cell. The UMTS multiple access scheme is a time-slotted system (i.e., Slotted ALOHA approach) in which a random access channel (RACH) and a packet transmission channel are formed on a slot by-slot basis. Time slot duration in each channel is chosen based on the particular system implemented. Generally, remote terminals that have packets to send transmit access requests via the RACH to a base station.

Figure 3B:
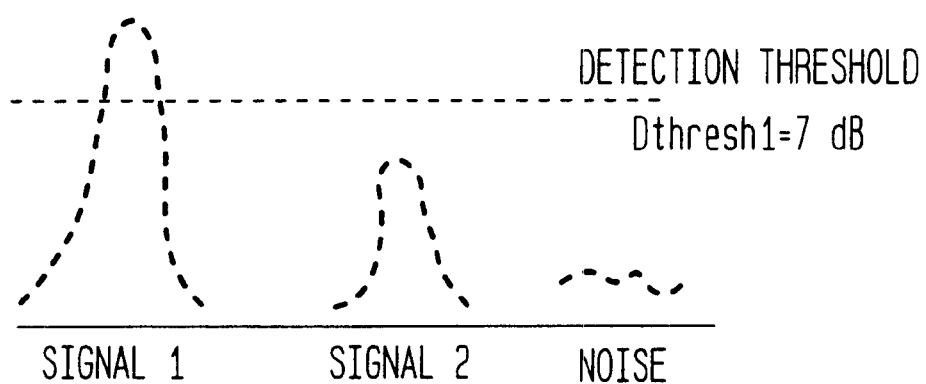
FIG. 3B is a graphical representation illustrating an existing detection algorithm.
Figure 3A:
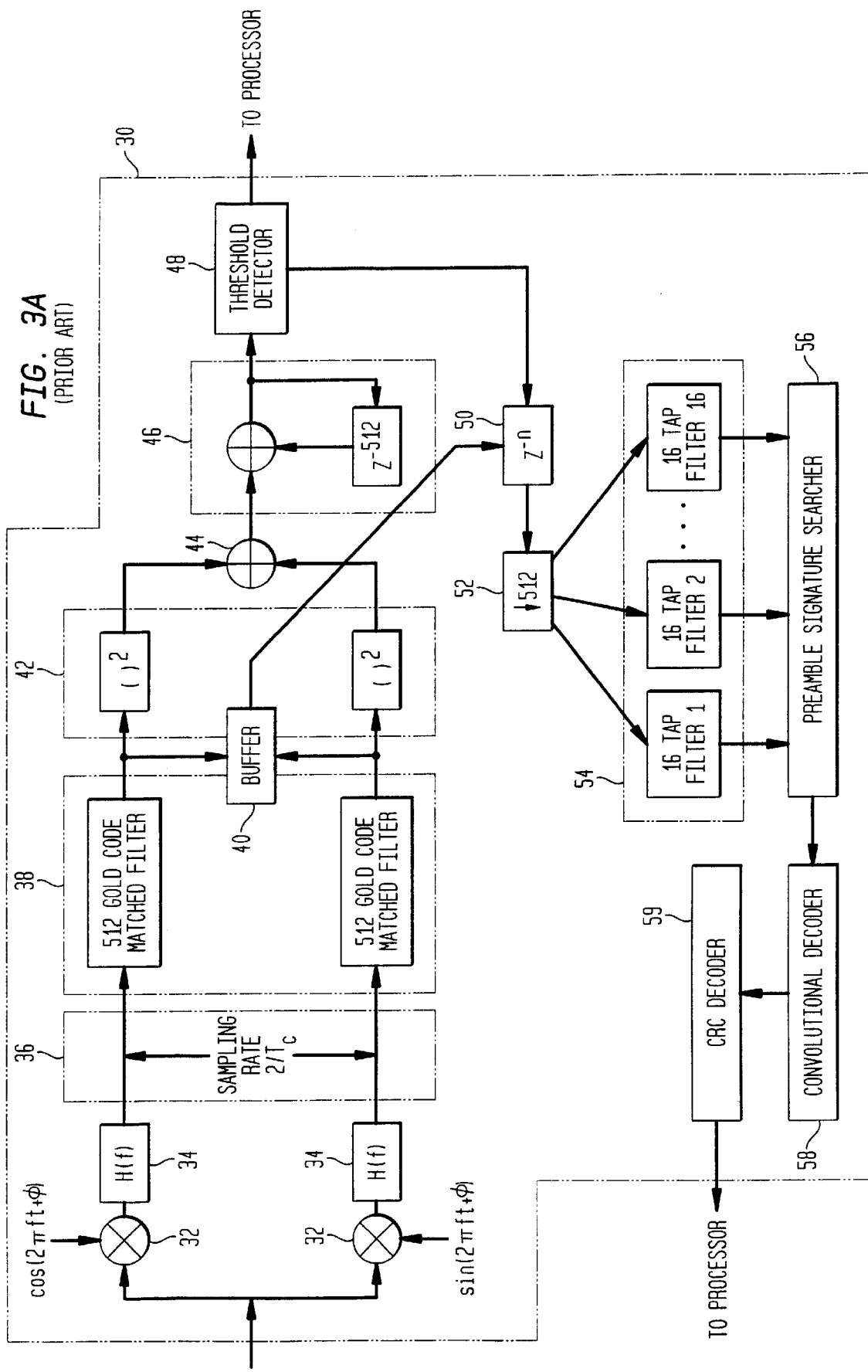
FIG. 3A is a block diagram of a non-coherent RACH receiver for use in a UMTS.
Figure 3C:
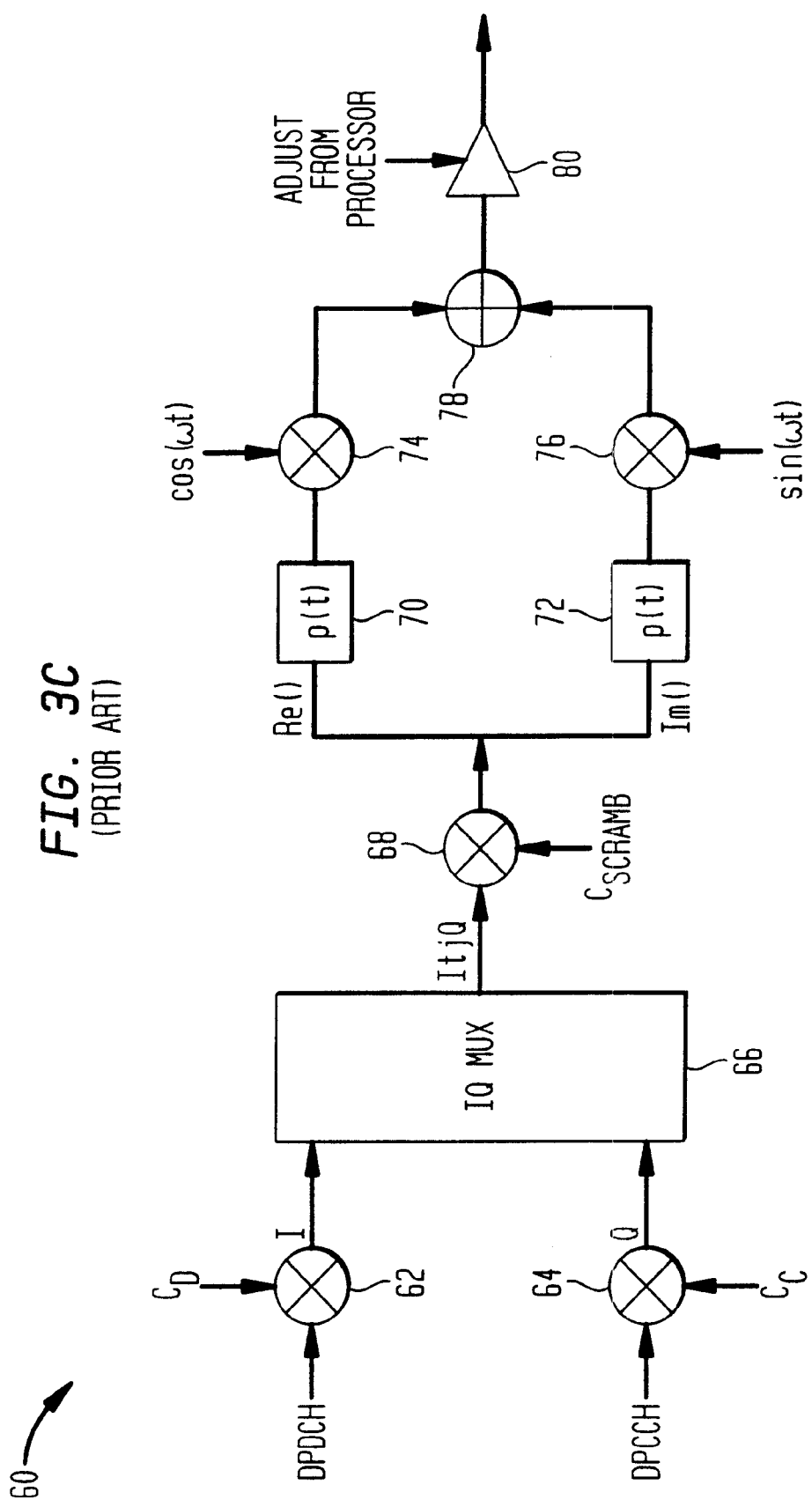
FIG. 3C is a block diagram of a transmitter for use in a UMTS.
Figure 4A:
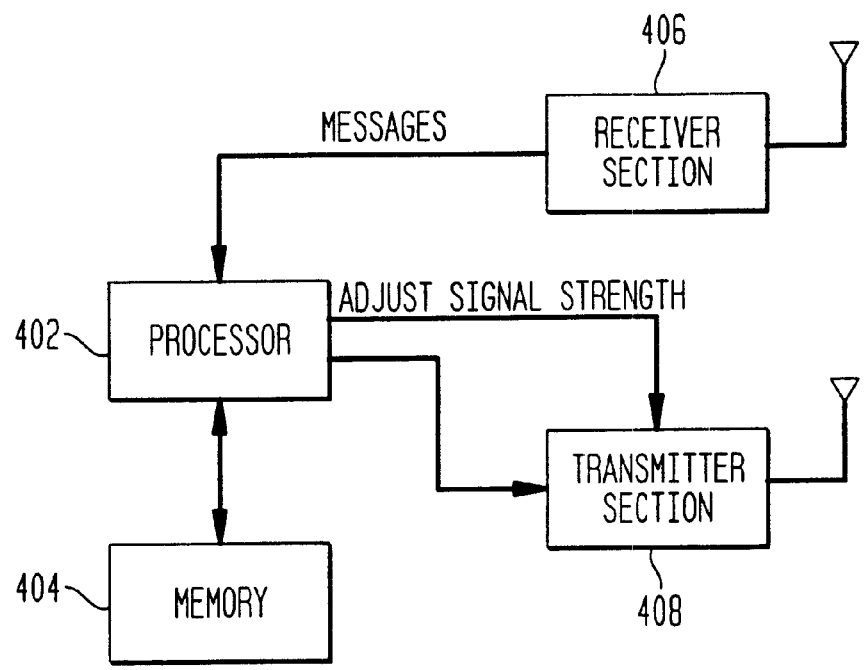
FIG. 4A is a block diagram of a remote terminal for use according to the present invention.

Referring to FIG. 4A, a block diagram of a remote terminal (e.g., remote terminal 2 and 4) for use according to the present invention is shown. The remote terminal includes a processor 402 for controlling operations associated with the terminal, in cooperation with its associated memory 404, including the methodologies of the invention to be described in detail below. The remote terminal also includes a receiver section 406 and a transmitter section 408. The specific elements of the receiver section 406 are not critical to the invention and, as such, are not described in detail herein. That is, a conventional receiver section capable of demodulating and decoding W-CDMA type signals may be employed. The transmitter section 408 may also be of a conventional type capable of encoding and modulating W-CDMA type signals such as, for example, data and control signals (e.g., access requests and data packets). The transmitter section may be as shown in FIG. 3C. In addition, a control signal line is shown in FIG. 4A as going to the transmitter section 408. Specifically, if the transmitter section 408 is the type shown in FIG. 3C, the control signal line is connected to the adjustment terminal of the amplifier 80. As is known, this control signal is used to adjust the signal strength of the signal transmitted by the remote terminal. Such adjustment will be further explained below in the context of the unique multi-threshold detection techniques of the invention.

Figure 4B:
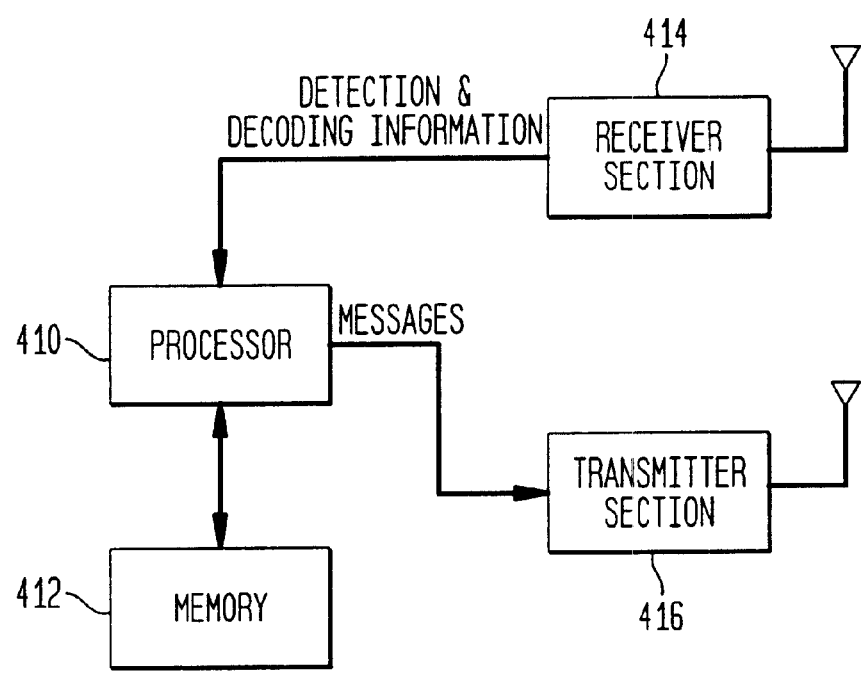
FIG. 4B is a block diagram of a base station for use according to the present invention.

Referring to FIG. 4B, a block diagram of a base station (e.g., base station 6) for use according to the present invention is shown. The base station includes a processor 410 for controlling operations associated with the station, in cooperation with its associated memory 412, including the methodologies of the invention to be described in detail below. The base station also includes a receiver section 414 and a transmitter section 416. The specific elements of the transmitter section 416 are not critical to the invention and, as such, are not described in detail herein. That is, a conventional transmitter receiver section capable of encoding and modulating W-CDMA type signals may be employed. The transmitter section may be similar to that shown in FIG. 3C. The receiver section 414 may also be of a conventional type capable of demodulating and decoding W-CDMA type signals. For example, the receiver section 414 may be a RACH receiver as shown in FIG. 3A. In which case, detection information (e.g., from threshold detector 48) and decoding information (e.g., from CRC decoder 59) are provided to the processor 410, as will be explained below in the context of the unique multi-threshold detection techniques of the invention.

The following is a description of a multi-threshold detection method of the invention preferably for implementation in accordance with a RACH receiver of a base station and a transmitter of a remote terminal. However, it should be understood that the invention is not limited to use in a random access request scheme. That is, the multi-threshold detection method may be implemented in accordance with any type of receiver in a remote terminal and any type of transmitter of a base station. Further, signal detection is not limited to access request signals but rather any type of signal, e.g., data signal, control signal, or other type of signal. The multi-threshold detection method according to an embodiment of the invention with respect to both a remote terminal and a base station will be jointly explained in the context of FIGS. 5 and 7, with reference to FIGS. 6A and 6B.

Figure 5:
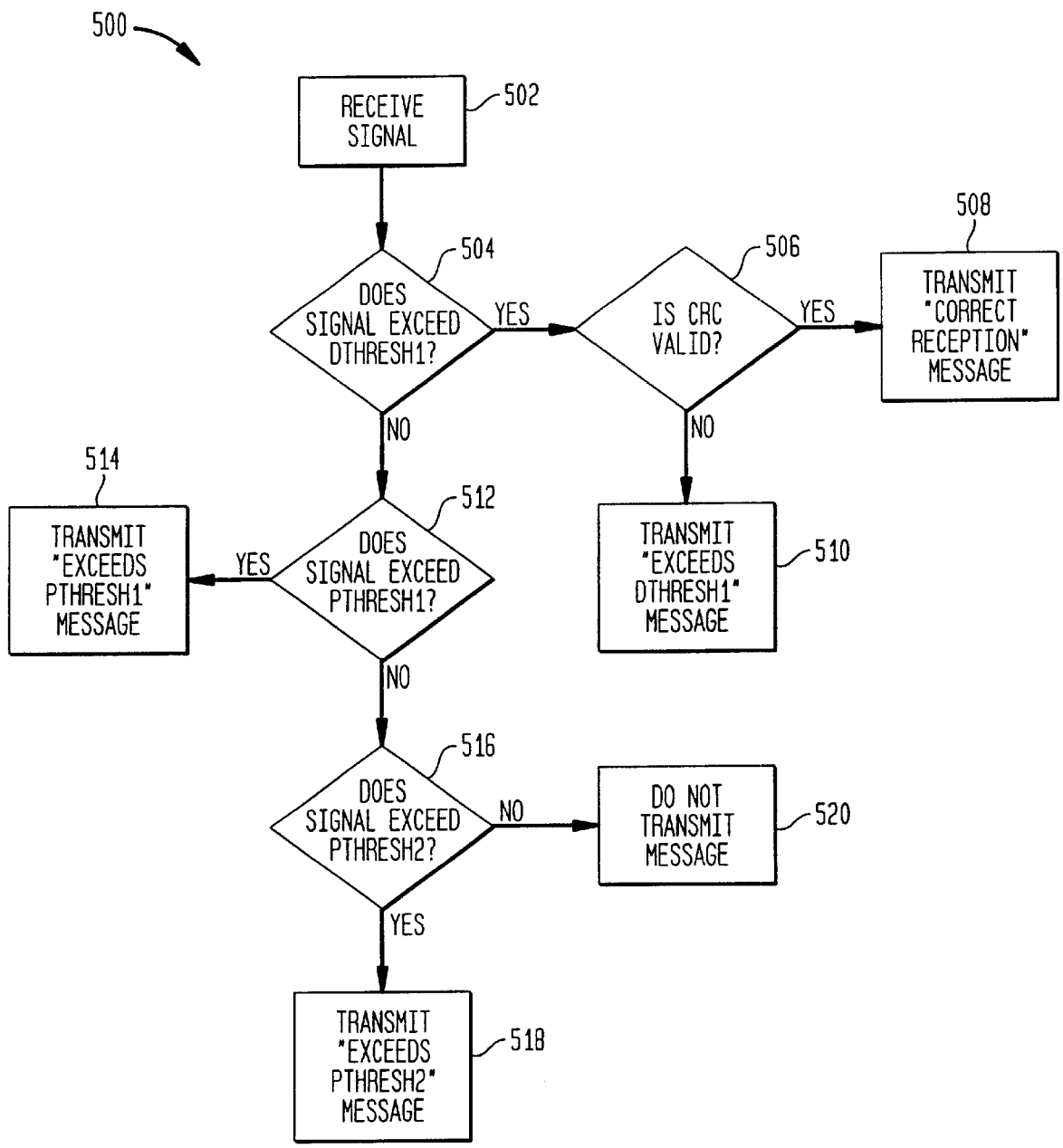
FIG. 5 is a flow chart of a multi-threshold detection method implemented in a base station according to an embodiment of the invention.
Figure 7:
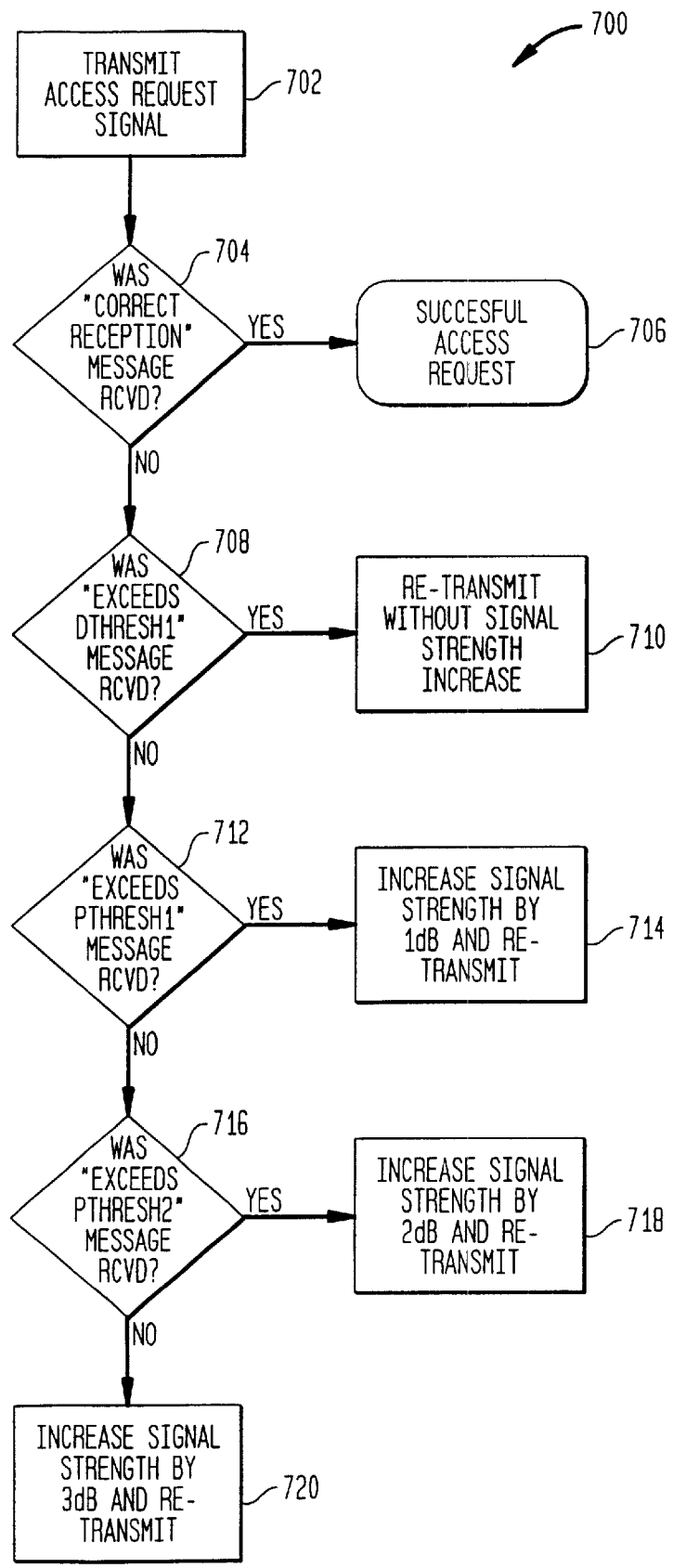
FIG. 7 is a flow chart of a multi-threshold detection method implemented in a remote terminal according to an embodiment of the invention.

Referring now to FIGS. 5 and 7, flow charts of a multi-threshold detection method according to an embodiment of the invention. The steps of FIG. 5 (502 through 520) are performed in a base station and the steps of FIG. 7 (702 through 720) are performed in a remote terminal. First, in step 502, the base station receives a signal, presumably a request signal transmitted (step 702) by a remote terminal seeking access to the communications system via the base station. Next, in step 504, the base station determines whether the signal exceeds DTHRESH1 (detection threshold level). DTHRESH1 may be, for example, about 7 dB. This determination may be accomplished by, for example, the threshold detector 48 (FIG. 3A), which then informs the processor 410 (FIG. 4B). Then, in step 506, the base station determines whether the CRC is valid. This determination may be accomplished by, for example, the CRC decoder 59 (FIG. 3A), which also then informs the processor 410 (FIG. 4B).

If the signal exceeds DTHRESH1 and the CRC is found to be valid, the base station generates (via processor 410) and transmits (through its transmitter section 416) a "correct reception" message to the remote terminal (step 508). If the remote terminal receives the "correct reception" message (via its receiver section 406), in step 704, it knows that its access request was successful (step 706) and it can then proceed to transmit desired data to the base station.

However, returning to the base station, if the CRC is not valid, the base station transmits, in step 510, an "exceeds DTHRESH1" message to indicate that the access request signal was of sufficient power, but that the CRC was not valid. If this message is received by the remote terminal (step 708), the remote terminal re-transmits the request signal without increasing the power level of the signal (step 710).

It is to be appreciated that while this description explains what happens when an original access request signal is sent and received with respect to the remote terminal and the base station, each time the base station receives a signal (re-transmitted or original signal), the detection algorithm returns to step 502 to repeat the detection process.

Returning now to step 504 in the base station, if the original signal transmitted by the remote terminal did not exceed DTHRESH1, the base station (threshold detector) determines whether the signal exceeds PTHRESH1 (step 512). It is to be understood that PTHRESH1 (power threshold level 1) is preferably about 5 dB. If the signal strength of the originally received signal exceeds PTHRESH1, then the base station transmits an "exceeds PTHRESH1" message to the remote terminal (step 514). When the remote terminal receives this message (step 712), the remote terminal increases its signal strength by about 1 dB and re-transmits the access request signal (step 714). It is to be understood that the remote terminal increases the signal strength by the processor 402 receiving the message from its receiver section 406 and sending a control signal to its transmitter section 408, particularly, the output amplifier 80, to increase the power level of the signal to be transmitted.

Returning to step 512 in the base station, if the original signal transmitted by the remote terminal did not exceed PTHRESH1, the base station (threshold detector) determines whether the signal exceeds PTHRESH2 (step 516). It is to be understood that PTHRESH2 (power threshold level 2) is preferably about 3 dB. If the signal strength of the originally received signal exceeds PTHRESH2, then the base station transmits an "exceeds PTHRESH1" message to the remote terminal (step 518). When the remote terminal receives this message (step 716), it increases its signal strength by about 2 dB and re-transmits the access request signal (step 718).

However, if the original signal does not exceed PTHRESH2, then the base station does not transmit any message (step 520). Since no message is received by the remote terminal after transmitting the original signal, the remote terminal increases its signal strength by about 3 dB and re-transmits the access request (step 720).

Figure 6A:
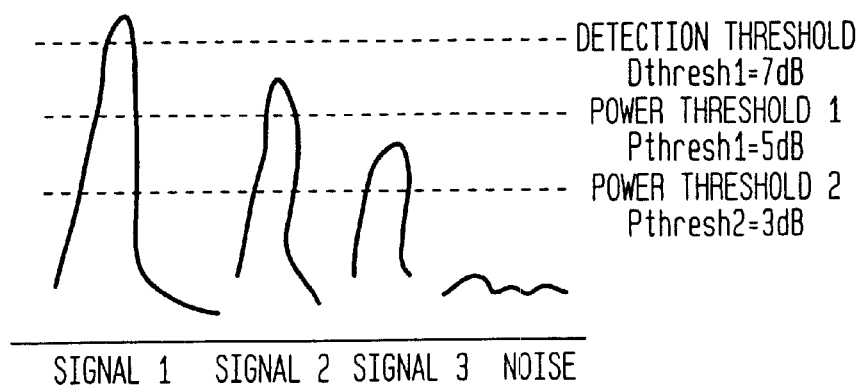
FIGS. 6A and 6B are graphical representations illustrating the multi-threshold detection method of FIG. 5.
Figure 6B:
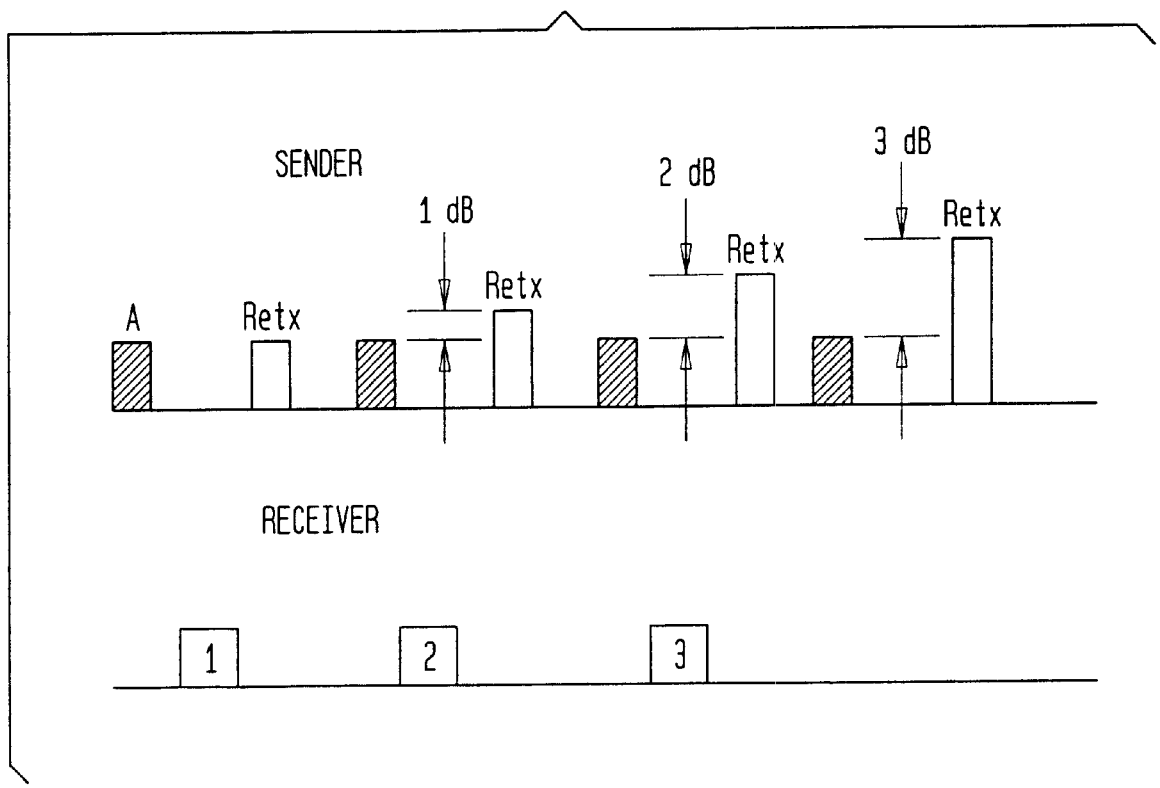

Referring to FIG. 6A, a graphical representation of the detection thresholds (DTHRESH1, PTHRESH1, PTHRESH2) of the invention is shown. It is to be appreciated that more or less threshold levels may be included so that finer or coarser detection may accomplished, respectively. Also, other thresholds may be employed, for example, rather than a signal having to exceed the threshold value, the signal being equal to the threshold may be used to trigger transmission of the above-described messages. Advantageously, access request signals below a typical detection level are still detected by a receiver, implementing the multi-threshold detection method of the invention, so that these weaker signals can be distinguished from collision-effected signals that cannot be detected or noise. Thus, while only signal 1 would be detected using an existing detection algorithm, signals 1, 2, and 3 are detected by detection algorithm of the invention. Lastly, FIG. 6B is a graphical representation illustrating the transfer of messages between the sender (remote terminal) and receiver (base station) as explained above in the context of FIGS. 5 and 7. The messages 1, 2, and 3 correspond to the messages "exceeds DTHRESH1," "exceeds PTHRESH1," and "exceeds PTHRESH2" transmitted by the receiver. The first shaded (hatched) message, labeled A, is the original signal transmitted by the sender. Each re-transmitted signal (retx) thereafter corresponds to the signal sent in response to a base station message. The magnitude of each re-transmitted signal is shown proportional to the increase in signal strength. The magnitude of the original signal (shaded or hatched) is shown along side the re-transmitted signal for comparison. It is to be appreciated that other power increments may be employed according to the invention.

It is to be appreciated that the methodology and apparatus of the invention require no change to the physical layer of the communications system. There is only one MAC-layer acknowledgement instead of requiring a physical-layer acknowledgement and a MAC-layer acknowledgement. Also, the enhanced detection algorithm of the invention allows the sender to increase power whenever necessary and hence increase the capacity of the UMTS or wideband CDMA (W-CDMA) system, which is an interference limited system.

Figure 8A:
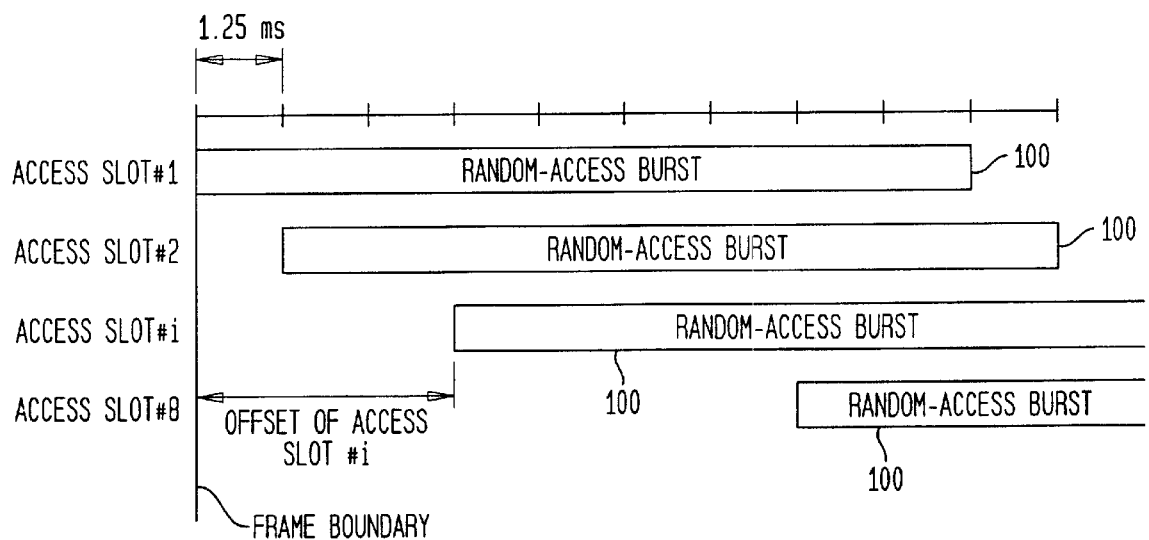
FIGS. 8A and 8B illustrate access slots and a structure of a random access burst used in a UMTS RACH.
Figure 8B:
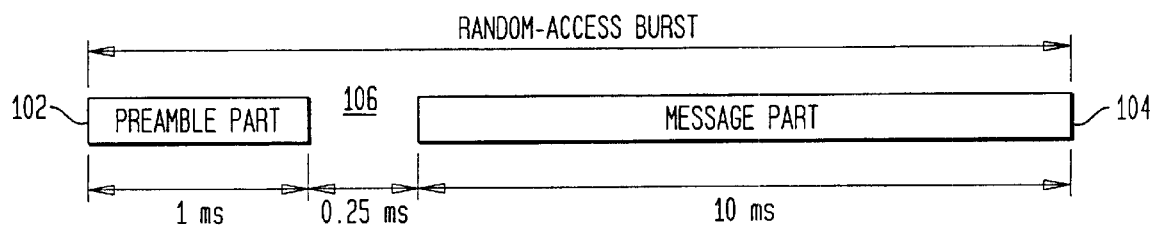

It is known that the physical RACH is designed based on a Slotted ALOHA approach. A remote terminal can transmit a random access burst 100 at eight well-defined time offsets (Access slot #1, . . . , Access slot #i, . . . , Access slot #8) relative to the frame boundary of the received broadcast control channel (BCCH) of the current cell, as illustrated in FIG. 8A. Each access slot is offset from the previous slot by 1.25 ms. As shown in FIG. 8B, the random access burst consists of two parts, a preamble part 102 of length 1 millisecond (ms), a message part 104 of length 10 ms, and an idle time 106 of length 0.25 ms in between the preamble part and the message part. There are a total of 16 different preamble signatures that are based on the Orthogonal Gold code set of length 16 (512 Gold code). The information on the available signatures and time offsets are broadcast on BCCH. Based on this structure, if the receiver has 128 (16 preamble signatures multiplied by 8 timeslots) parallel processing units, 128 random access attempts can be simultaneously detected. In other words, we have equivalent 128 random access channels for a maximum configured base station for the current cell. This arrangement is as per the current Layer 1 Expert Group specification in UTRAN/FDD Physical Layer Description Document, "SMG2 UMTS Physical Layer Description FDD Part," Tdoc SMG2 UMTS-L1 221/98.

Referring to FIG. 8C, a RACH access slot structure is shown in which the frame structure (Frame 0, Frame 1 . . . , Frame n) is based on 10 milliseconds (ms). Also, it is assumed that the receiver requires a minimum of 2.5 ms to process an access burst. As shown, those remote terminals that have selected time offsets 0, 1, 2, 3, 4, and 5, can receive their MAC acknowledgements (from the base station) within 8.75 ms of their transmissions. That is, the maximum waiting period for an access burst (request signal), transmitted by a remote terminal within slots 0 through 5, is 8.75 ms. For example, Burst 0 is transmitted by a remote terminal at the start of Frame 0 and the remote terminal may receive an acknowledgement in response at the start of Frame 2, i.e., 8.75 ms later. Bursts 1 through 5 receive acknowledgements progressively sooner, up to Burst 5 which can receive an acknowledgement 2.5 ms after transmission. Acknowledgements generated by a base station for transmission in a given frame are typically grouped together in a common packet broadcast to the transmitting remote terminals.

However, as is evident, those terminals that have selected time offsets 6 and 7 can only receive their MAC layer acknowledgements within a maximum of 11.25 ms of their transmission, i.e., Burst 6 at 11.25 ms and Burst 7 at 10 ms. Again, this has to do with the fact that the minimum time to process an access request is assumed to be 2.5 ms. As such, access bursts 6 or 7 transmitted by remote terminals in Frame 1 extend beyond the 2.5 ms minimum processing period such that the base station cannot process the request and transmit acknowledgements in Frame 2. Thus, such remote terminals do not receive respective acknowledgements until Frame 3.

It is to be appreciated that the enhanced detection algorithm of the invention also allows the receiver to send MAC-layer acknowledgements earlier than the existing UMTS RACH procedure. For example, consider a case where two remote terminals choose the same time offset slot to transmit an access burst (request signal). The existing UMTS RACH procedure uses the data decoder output to determine if there is a correct reception. So, the two senders wait for about 20 milliseconds (the acknowledgement indicator can only be processed after the whole downlink frame is received) before they discover that their transmissions fail. With the detection algorithm of the invention, it is preferably assumed that the physical layer sends an appropriate primitive to the MAC layer immediately after the idle time (about 1.25 milliseconds after the start of the access burst) to generate an appropriate acknowledgement indicator to the sender. Thus, the two senders wait, at most, only about 10 milliseconds to know what power increment they should use for their re-transmitted access request. This may be illustrated with respect to Bursts 6 or 7 in FIG. 8C. If a remote terminal transmits an access burst, in a conventional arrangement, the terminal does not receive any indication until about 20 milliseconds, that is, until the transmission downlinked from the base station in Frame 3 is completely received. However, if the multi-detection threshold algorithm of the invention is employed, each remote terminal can receive a message from the base station in Frame 2 indicating the necessary amount of power increase (as denoted in phantom line in FIG. 8C), if the access burst fails. This is due to the fact that the base station, employing the multi-detection threshold algorithm of the invention, detects the signal strength before the access burst is complete thus enabling it to send the appropriate acknowledgement message to the terminal in the next frame. If the received signal strength exceeds DTHRESH1, the base station still needs to wait until Frame 3 to send the acknowledgement for Burst 6 or 7 in FIG. 8C.

Although illustrative embodiments of the present invention have been described herein with reference to the accompanying drawings, it is to be understood that the invention is not limited to those precise embodiments, and that various other changes and modifications may be affected therein by one skilled in the art without departing from the scope and spirit of the invention.

What is claimed is:

1. A method for use in a receiver of detecting a random access request signal transmitted by a transmitter, the method comprising the steps of:
   determining whether the random access request signal, received over a random access channel accessible by two or more transmitters capable of transmitting respective random access request signals, is below an initial detection threshold value;
   determining whether the random access request signal is greater than or equal to at least a first power threshold value when the random access request signal is below the initial detection threshold value; and
   informing the transmitter when the random access request signal is greater than or equal to the first power threshold value such that the transmitter can increase a signal strength of the random access request signal by a first predetermined amount and re-transmit, the first predetermined amount being relative to a difference between the initial detection threshold value and the first power threshold value.

2. The method of claim 1, further comprising the step of informing the transmitter when the signal is greater than or equal to the initial detection threshold value but included an invalid CRC code such that the transmitter can re-transmit.

3. The method of claim 1, further comprising the step of informing the transmitter when the signal is greater than or equal to the initial detection threshold value and included a valid CRC code.

4. The method of claim 1, wherein the signal transmitted by the transmitter is one of an access request signal and a data packet.

5. The method of claim 1, wherein the receiver is in a base station.

6. The method of claim 1, wherein the transmitter is in a remote terminal.

7. The method of claim 1, wherein the receiver and transmitter are in a UMTS.

8. The method of claim 7, wherein the receiver includes a RACH receiver.

9. The method of claim 1, wherein the determining step is performed prior to completion of the transmission of the signal.

10. A method for use in a receiver of detecting a random access request signal transmitted by a transmitter, the method comprising the steps of:
    determining whether the random access request signal, received over a random access channel accessible by two or more transmitters capable of transmitting respective random access request signals, is greater than or equal to at least a first power threshold value when the random access request signal is below an initial detection threshold value; and
    informing the transmitter when the random access request signal is greater than or equal to the first power threshold value such that the transmitter can increase a signal strength of the random access request signal by a first predetermined amount and re-transmit;
    determining whether the random access request signal is greater than or equal to a second power threshold value when the random access request signal is below the initial detection threshold value and the first power threshold value; and
    informing the transmitter when the random access request signal is greater than or equal to the second power threshold value such that the transmitter can increase the signal strength of the random access request signal by a second predetermined amount and re-transmit.

11. The method of claim 10, further comprising the step of providing the transmitter with no indication when the signal is not greater than or equal to the second power threshold value such that the transmitter can increase the signal strength of the signal by a third predetermined amount and re-transmit.

12. Apparatus for detecting a random access request signal transmitted by a transmitter, comprising:
    a receiver configured for determining whether the random access request signal, received over a random access channel accessible by two or more transmitters capable of transmitting respective random access request signals, is below an initial detection threshold value, determining whether the random access request signal is greater than or equal to at least a first power threshold value when the random access request signal is below the initial detection threshold value, and informing the transmitter when the random access request signal is greater than or equal to the first power threshold value such that the transmitter can increase a signal strength of the random access request signal by a first predetermined amount and re-transmit, the first predetermined amount being relative to a difference between the initial detection threshold value and the first power threshold value.

13. The apparatus of claim 12, wherein the receiver is further configured for informing the transmitter when the signal is greater than or equal to the initial detection threshold value but included an invalid CRC code such that the transmitter can re-transmit.

14. The apparatus of claim 12, wherein the receiver is further configured for informing the transmitter when the signal is greater than or equal to the initial detection threshold value and included a valid CRC code.

15. The apparatus of claim 12, wherein the signal transmitted by the transmitter is one of an access request signal and a data packet.

16. The apparatus of claim 12, wherein the receiver is in a base station.

17. The apparatus of claim 12, wherein the transmitter is in a remote terminal.

18. The apparatus of claim 12, wherein the receiver and transmitter are in a UMTS.

19. The apparatus of claim 18, wherein the receiver includes a RACH receiver.

20. The apparatus of claim 12, wherein the receiver is further configured for performing the threshold determination prior to completion of the transmission of the signal.

21. Apparatus for detecting a random access request signal transmitted by a transmitter, comprising:
    a receiver configured for determining whether the random access request signal, received over a random access channel accessible by two or more transmitters capable of transmitting respective random access request signals, is greater than or equal to at least a first power threshold value when the random access request signal is below an initial detection threshold value, and informing the transmitter when the random access request signal is greater than or equal to the first power threshold value such that the transmitter can increase a signal strength of the random access request signal by a first predetermined amount and re-transmit;

wherein the receiver is further configured for determining whether the random access request signal is greater than or equal to a second power threshold value when the random access request signal is below the initial detection threshold value and the first power threshold value, and informing the transmitter when the random access request signal is greater than or equal to the second power threshold value such that the transmitter can increase the signal strength of the random access request signal by a second predetermined amount and re-transmit.

22. The apparatus of claim 21, wherein the receiver is further configured for providing the transmitter with no indication when the signal is not greater than or equal to the second power threshold value such that the transmitter can increase the signal strength of the signal by a third predetermined amount and re-transmit.

23. A multi-threshold detection receiver for detecting a random access request signal transmitted by a transmitter, comprising:
   a multi-threshold detector for determining whether the random access request signal, received over a random access channel accessible by two or more transmitters capable of transmitting respective random access request signals, is below an initial detection threshold value, and determining whether the random access request signal is greater than or equal to a least a first power threshold value when the random access request signal is below the initial detection threshold value; and
   a transmission section for informing the transmitter when the random access request signal is greater than or equal to the first power threshold value such that the transmitter can increase a signal strength of the random access request signal by a first predetermined amount and re-transmit, the first predetermined amount being relative to a difference between the initial detection threshold value and the first power threshold value.

24. A power ramping method for use in a receiver of detecting a signal transmitted by a transmitter, the method comprising the steps of:
   determining whether the signal is greater than or equal to a first power threshold value when the signal is below an initial detection threshold value;
   informing the transmitter when the signal is greater than or equal to the first power threshold value such that the transmitter can increase a signal strength of the signal by a first predetermined amount and re-transmit;
   determining whether the signal is greater than or equal to a second power threshold value when the signal is below the initial detection threshold value and the first power threshold value;
   informing the transmitter when the signal is greater than or equal to the second power threshold value such that the transmitter can increase the signal strength of the signal by a second predetermined amount and re-transmit; and
   providing the transmitter with no indication when the signal is not greater than or equal to the second power threshold value such that the transmitter can increase the signal strength of the signal by a third predetermined amount and re-transmit.

25. A method for use in a transmitter of power ramping a random access request signal, the method comprising the steps of:
   transmitting the random access request signal over a random access channel accessible by two or more transmitters capable of transmitting respective random access request signals;
   increasing a signal strength of the random access request signal by a first predetermined amount when informed by a receiver to do so in response to the receiver receiving the random access request signal, performing a multi-threshold detection operation, and determining that the random access request signal is greater than or equal to a first power threshold value but below an initial detection threshold value, the first predetermined amount being relative to a difference between the initial detection threshold value and the first power threshold value; and
   re-transmitting the random access request signal.

26. The method of claim 25, wherein the signal transmitted by the transmitter is one of an access request signal and a data packet.

27. The method of claim 25, wherein the receiver is in a base station.

28. The method of claim 25, wherein the transmitter is in a remote terminal.

29. The method of claim 28, wherein the receiver includes a RACH receiver.

30. The method of claim 25, wherein the receiver and transmitter are in a UMTS.

31. A method for use in a transmitter of power ramping a random access request signal, the method comprising the steps of:
   transmitting the random access request signal over a random access channel accessible by two or more transmitters capable of transmitting respective random access request signals;
   increasing a signal strength of the random access request signal by a first predetermined amount when informed by a receiver receiving the random access request signal that the random access request signal is greater than or equal to a first power threshold value but below an initial detection threshold value;
   re-transmitting the random access request signal; and
   increasing the signal strength of the random access request signal by a second predetermined amount for re-transmission when informed by the receiver that the random access request signal is greater than or equal to a second power threshold value but below the initial detection threshold value and the first power threshold value.

32. The method of claim 31, further comprising the step of increasing the signal strength of the signal by a third predetermined amount for re-transmission when no indication is received from the receiver.

33. The method of claim 32, further comprising the step of re-transmitting the signal when informed by the receiver that the signal is greater than or equal to the initial detection threshold value but included an invalid CRC code.

34. Apparatus for power ramping a random access request signal, comprising:
   a transmitter configured for transmitting the random access request signal over a random access channel accessible by two or more transmitters capable of transmitting respective random access request signals, increasing a signal strength of the random access request signal by a first predetermined amount for re-transmission when informed by an associated receiver to do so in response to the receiver receiving the random access request signal, performing a multi-threshold detection operation, and determining that the random access request signal is greater than or equal to a first power threshold value but below an initial detection threshold value, the first predetermined amount being relative to a difference between the initial detection threshold value and the first power threshold value.

35. The apparatus of claim 34, wherein the signal transmitted by the transmitter is one of an access request signal and a data packet.

36. The apparatus of claim 34, wherein the receiver is in a base station.

37. The apparatus of claim 34, wherein the transmitter is in a remote terminal.

38. The apparatus of claim 34, wherein the receiver and transmitter are in a UMTS.

39. The apparatus of claim 38, wherein the receiver includes a RACH receiver.

40. Apparatus for power ramping a random access request signal, comprising:
   a transmitter configured for transmitting the random access request signal over a random access channel accessible by two or more transmitters capable of transmitting respective random access request signals, increasing a signal strength of the random access request signal by a first predetermined amount for re-transmission when informed by an associated receiver receiving the random access request signal that the random access request signal is greater than or equal to a first power threshold value but below an initial detection threshold value;
   wherein the transmitter is further configured for increasing the signal strength of the random access request signal by a second predetermined amount for re-transmission when informed by the receiver that the random access request signal is greater than or equal to a second power threshold value but below the initial detection threshold value and the first power threshold value.

41. The apparatus of claim 40, wherein the transmitter is further configured for increasing the signal strength of the signal by a third predetermined amount for re-transmission when no indication is received from the receiver.

42. The apparatus of claim 41, wherein the transmitter is further configured for re-transmitting the signal when informed by the receiver that the signal is greater than or equal to the initial detection threshold value but included an invalid CRC code.

43. A method for use in a receiver of detecting a signal transmitted by a transmitter, the method comprising the steps of:
   determining whether the signal is greater than or equal to at least a first power threshold value when the signal is below an initial detection threshold value; and
   informing the transmitter when the signal is greater than or equal to the first power threshold value such that the transmitter can increase a signal strength of the signal by a first predetermined amount and re-transmit;
   determining whether the signal is greater than or equal to a second power threshold value when the signal is below the initial detection threshold value and the first power threshold value;
   informing the transmitter when the signal is greater than or equal to the second power threshold value such that the transmitter can increase the signal strength of the signal by a second predetermined amount and re-transmit; and
   providing the transmitter with no indication when the signal is not greater than or equal to the second power threshold value such that the transmitter can increase the signal strength of the signal by a third predetermined amount and re-transmit.

44. Apparatus for detecting a signal transmitted by a transmitter, comprising:
   a receiver configured for determining whether the signal is greater than or equal to at least a first power threshold value when the signal is below an initial detection threshold value, and informing the transmitter when the signal is greater than or equal to the first power threshold value such that the transmitter can increase a signal strength of the signal by a first predetermined amount and re-transmit;
   wherein the receiver is further configured for determining whether the signal is greater than or equal to a second power threshold value when the signal is below the initial detection threshold value and the first power threshold value, informing the transmitter when the signal is greater than or equal to the second power threshold value such that the transmitter can increase the signal strength of the signal by a second predetermined amount and re-transmit, and providing the transmitter with no indication when the signal is not greater than or equal to the second power threshold value such that the transmitter can increase the signal strength of the signal by a third predetermined amount and re-transmit.

45. A method for use in a transmitter of power ramping a signal transmitted by the transmitter and received by a receiver, the method comprising the steps of:
   increasing a signal strength of the signal by a first predetermined amount when informed by the receiver that the signal is greater than or equal to a first power threshold value but below an initial detection threshold value;
   re-transmitting the signal;
   increasing the signal strength of the signal by a second predetermined amount for re-transmission when informed by the receiver that the signal is greater than or equal to a second power threshold value but below the initial detection threshold value and the first power threshold value; and
   increasing the signal strength of the signal by a third predetermined amount for re-transmission when no indication is received from the receiver.

46. The method of claim 45, further comprising the step of re-transmitting the signal when informed by the receiver that the signal is greater than or equal to the initial detection threshold value but included an invalid CRC code.

47. Apparatus for power ramping a signal, comprising:
   a transmitter configured for increasing a signal strength of the signal by a first predetermined amount for re-transmission when informed by an associated receiver that the signal is greater than or equal to a first power threshold value but below an initial detection threshold value;
   wherein the transmitter is further configured for increasing the signal strength of the signal by a second predetermined amount for re-transmission when informed by the receiver that the signal is greater than or equal to a second power threshold value but below the initial detection threshold value and the first power threshold value, and increasing the signal strength of the signal by a third predetermined amount for re-transmission when no indication is received from the receiver.

48. The apparatus of claim 47, wherein the transmitter is further configured for re-transmitting the signal when informed by the receiver that the signal is greater than or equal to the initial detection threshold value but included an invalid CRC code.

49. A method for use in a receiver of detecting a random access request signal transmitted by a transmitter, the method comprising the steps of:

determining how the signal strength of the random access request signal, received over a random access channel accessible by two or more transmitters capable of transmitting respective random access request signals, compares with respect to two or more detection threshold values;

instructing the transmitter to adjust the signal strength of the random access request signal by one of one or more predetermined amounts based on the comparisons of the signal strength of the random access request signal with the two or more detection thresholds; and re-transmitting the adjusted random access request signal.

50. A method for use in a transmitter of power ramping a random access request signal, the method comprising the steps of:

adjusting a signal strength of the random access request signal by one of one or more predetermined amounts when instructed by a receiver to do so in response to the receiver receiving the random access request and determining how the signal strength of the random access request signal compares with respect to two or more detection threshold values; and re-transmitting the random access request signal.

* * * * *

UNITED STATES PATENT AND TRADEMARK OFFICE
CERTIFICATE OF CORRECTION

PATENT NO.    : 6,587,672 B1
DATED         : July 1, 2003
INVENTOR(S)   : M.C. Chuah et al.

It is certified that error appears in the above-identified patent and that said Letters Patent is hereby corrected as shown below:

<u>Column 1,</u>
Line 9, replace paragraph with the following:
-- This application is related to the U.S. patent application identified as Serial No. 09/203,932, entitled: "Methods and Apparatus For Providing Short RACH Frames For Fast Latency," and filed concurrently on December 2, 1998. --

Signed and Sealed this

Eleventh Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,587,672 B1
DATED : July 1, 2003
INVENTOR(S) : M.C. Chuah et al.

It is certified that error appears in the above-identified patent and that said Letters Patent is hereby corrected as shown below:

<u>Title page,</u>
Item [56], References Cited, OTHER PUBLICATIONS, add the following:
--E. Dahlman et al., "UMTS/IMT-2000 Based on Wideband CDMA," IEEE Communications Magazine, pp. 70-80, September 1998.

ETSI SMG2/UMTS L2 & L3 Expert Group, "MS-UTRAN Radio Interface Protocol Architecture; Stage 2," Tdoc SMG2 UMTS-L23 172/98, September 1998.

ETSI SMG2/UMTS Physical Layer Expert Group, "UTRA Physical Layer Description FDD Parts," Tdoc SMG2 UMTS-L1 221/98, Vol. 4, June 1998.

ETSI SMG2/UMTS L1 Expert Group, "Modification of the Current RACH Scheme for Increased Throughput," Tdoc SMG2 UMTS-L1 455/98, pp. 1-5, October 1998.--

Signed and Sealed this

Twenty-fourth Day of February, 2004

JON W. DUDAS
*Acting Director of the United States Patent and Trademark Office*